United States Patent
Rav-Acha

(10) Patent No.: US 7,894,528 B2
(45) Date of Patent: Feb. 22, 2011

(54) FAST AND ROBUST MOTION COMPUTATIONS USING DIRECT METHODS

(75) Inventor: Alexander Rav-Acha, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 1308 days.

(21) Appl. No.: 11/440,591

(22) Filed: May 25, 2006

(65) Prior Publication Data

US 2006/0280334 A1    Dec. 14, 2006

Related U.S. Application Data

(60) Provisional application No. 60/684,191, filed on May 25, 2005, provisional application No. 60/721,099, filed on Sep. 28, 2005.

(51) Int. Cl.
H04N 7/12      (2006.01)
G06K 9/00      (2006.01)

(52) U.S. Cl. ................... 375/240.16; 382/103

(58) Field of Classification Search ............. 348/47, 348/48, 49, 50, 51; 382/294, 278, 296, 297, 382/298, 299, 312, 277, 274, 276, 284, 287, 382/289, 151, 103, 107; 375/240.16, 240.12, 375/240.24, 240.01, 240
See application file for complete search history.

(56) References Cited

U.S. PATENT DOCUMENTS 6,219,462 B1 * 4/2001 Anandan et al. ............ 382/294

2004/0130552 A1 * 7/2004 Duluk et al. ................ 345/506

OTHER PUBLICATIONS

Lucas, B. et al., "An interactive image registration technique with an application to stereo vision"; IJCAI; pp. 674-679, 1981.
Bergen, J. et al., "Hierarchical model-based motion estimation"; ECCV'92, pp. 237-252, Italy, 1992.
Irani, M. et al., "Computing occluding and transparent motions"; Int. J. Computer Vision, vol. 12, pp. 5-16, 1994.
Baker, S. et al., "Lucas-kanade 20 years on: A unifying framework"; International Journal of Computer Vision; vol. 56, pp. 221-255, 2004.
Shi, J. et al., "Good features to track"; CVPR; Seattle, 1994.

(Continued)

*Primary Examiner*—Behrooz Senfi
(74) *Attorney, Agent, or Firm*—Browdy and Neimark, PLLC

(57) ABSTRACT

A respective intensity gradient of a first spatially aligned pixel in each frame of a sequence of images is multiplied by a respective intensity or function thereof of a second pixel in the new frame, this being done for all pixels in the set and the resulting products being summed. This is repeated so that in one of the sums the first and second pixels have identical locations in the respective frames and where in each additional sum the second pixel is shifted by a non-zero shift relative to its location in other sums. The transformation is computed using intensity and gradient values of the image frames in the sequence and the sums. Weighted averages of at least two of the sums are stored and used together with the intensity and gradient values of the frames in the sequence to re-compute the transformation.

24 Claims, 5 Drawing Sheets

OTHER PUBLICATIONS

Burt, P. et al., "Mechanisms for isolating component patterns in the sequential analysis of multiple motion"; Visual Motion, Proceedings of the IEEE Workshop, pp. 187-193, 1991.

Triggs, B. et al., "Bundle adjustment- A modern synthesis"; Vision Algorithms: Theory and Practice.; LNCS, Springer Verlag, pp. 298-375, 2000.

Shum, H. et al., "Construction and refinement of panoramic mosaics with global and local alignment"; ICCV 98, Washington, DC, pp. 953-958, 1998.

Sawhney, S.H. et al., "Robust video mosaicing through topology inference and local to global alignment"; ECCV, pp. 103-119, 1998.

Sawhney, H. et al., "True multi-image alignment and its application to mosaicing and lens distortion correction"; PAMI, vol. 21, pp. 245-243, 1999.

Irani, M., "Multi-frame optical flow estimation using subspace constraints"; IEEE International Conference on Computer Vision; Corfu, 1999.

Torr, P. et al., "A new robust estimator with application to estimating image geometry"; CVIU, vol. 78, pp. 138-156, 2000.

Capel, D. et al., Automated mosaicing with super-resolution zoom; CVPR, Santa Barbara, 1998, pp. 885-891.

Yalcin, H. et al., A flow-based approach to vehicle detection and background mosaicking in airborne video; Video Proceedings in conjunction with CVPR'05, 2005.

Bergen, J. et al., A three frame algorithm for estimating two-component image; IEEE Trans. On PAMI 14, 1992, pp. 886-896.

* cited by examiner

FIG. 4a
FIG. 4b
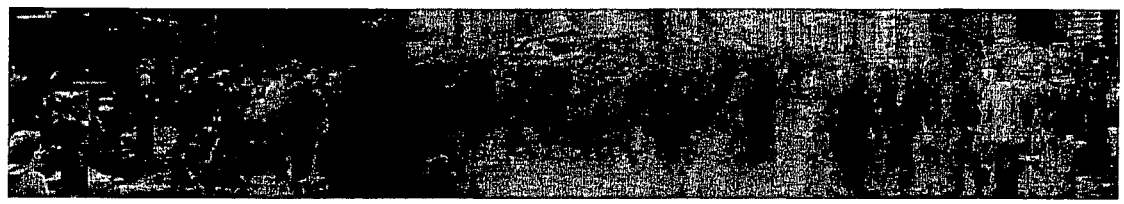
FIG. 4c
(PRIOR ART)
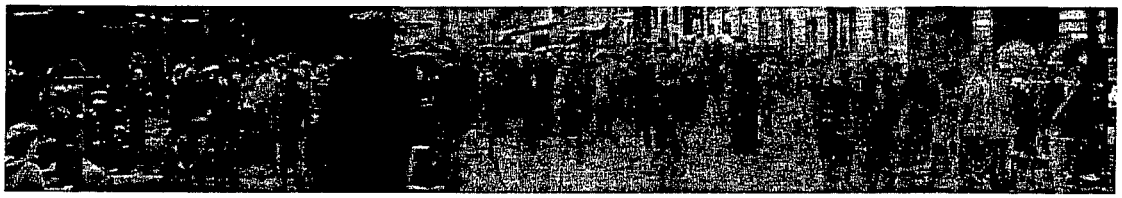
FIG. 4d
FIG. 5a
FIG. 5b
(PRIOR ART)
FIG. 5c
FIG. 5d
FIG. 5e
(PRIOR ART)
FIG. 5f

FAST AND ROBUST MOTION COMPUTATIONS USING DIRECT METHODS

RELATED APPLICATIONS

This application claims benefit of provisional applications Ser. Nos. 60/684,191 filed May. 25, 2005 and 60/721,099 filed Sep. 28, 2005 whose contents are included herein by reference.

FIELD OF THE INVENTION

This invention relates to transformation of a set of image locations between image frames.

PRIOR ART

Prior art references considered to be relevant as a background to the invention are listed below and their contents are incorporated herein by reference. Additional references are mentioned in the above-mentioned US provisional applications Nos. 60/684,191 and 60/721,099 and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] B. Lucas and T. Kanade: An iterative image registration technique with an application to stereo vision. *IJCAI*, pages 674-679, 1981.
[2] Bergen, J., Anandan, P., Hanna, K., Hingorani, R.: Hierarchical model-based motion estimation. *ECCV'92*, Italy (1992) 237-252
[3] Irani, M., Rousso, B., Peleg, S.: Computing occluding and transparent motions. *Int. J Computer Vision* 12 (1994) 5-16
[4] Baker, S., Matthews, I.: Lucas-kanade 20 years on: A unifying framework. *International Journal of Computer Vision* 56 (2004) 221-255
[5] Shi, J., Tomasi, C.: Good features to track. CVPR, Seattle (1994)
[6] Burt, P., Hingorani, R., Kolczynski, R.: Mechanisms for isolating component patterns in the sequential analysis of multiple motion. *Visual Motion, Proceedings of the IEEE Workshop*. (1991) 187-193.
[7] Triggs, B., McLauchlan, P., Hartley, R., Fitzgibbon, A.: Bundle adjustment—A modem synthesis. In Triggs, W., Zisserman, A., Szeliski, R., eds.: Vision Algorithms: Theory and Practice. *LNCS*. Springer Verlag (2000) 298-375
[8] Shum, H., Szeliski, R.: Construction and refinement of panoramic mosaics with global and local alignment. *ICCV'98*, Washington, D.C., USA (1998) 953-958.
[9] Sawhney, S. H., Hsu, S., Kumar, R.: Robust video mosaicing through topology inference and local to global alignment. *ECCV*. (1998) 103-119.
[10] Sawhney, H., Kumar, R.: True multi-image alignment and its application to mosaicing and lens distortion correction. *PAMI* 21 (1999) 245-243.
[11] Irani, M.: Multi-frame optical flow estimation using subspace constraints. *IEEE International Conference on Computer Vision* (ICC V), Corfu (1999).
[12] Torr, P., Zisserman, A.: MLESAC: A new robust estimator with application to estimating image geometry. *CVIU* 78 (2000) 138-156.
[13] Capel, D., Zisserman, A.: Automated mosaicing with super-resolution zoom. *CVPR*, Santa Barbara (1998) 885-891.
[14] Yalcin, H., Collins, R., Hebert, M., Black, M. J.: A flow-based approach to vehicle detection and background mosaicking in airborne video. *Video Proceedings in conjunction with CVPR'05*. (2005).
[15] Bergen, J., Burt, P., Hingorani, R., Peleg, S.: A three frame algorithm for estimating two-component image motion. *IEEE Trans. on PAMI* 14 (1992) 886-896.

BACKGROUND OF THE INVENTION

Although many robust methods exist for motion computation, the iterative motion analysis proposed by Lucas and Kanade [1] still dominates the field of motion analysis. It is widely used both for parametric motion computations (for example by [2,3,4]) and for object tracking [5]. The popularity of the LK method is due to its simplicity and stability (see for example [6]).

We will refer to the various applications which use the Lucas-Kanade method as 'LK', although the original application addressed by [1] was mainly stereo computation.

An important component of the LK method is the iterative convergence to an accurate solution while using linear approximations. The more iterations that are required, the more computer resources are needed. These computer resources manifest themselves as computer memory and computer processing time or a combination of both. Therefore, it is desirable to reduce the number of iterations required by the LK method so as to reduce the computer resources required to achieve convergence.

SUMMARY OF THE INVENTION

The present invention allows the LK to be implemented at a cost of substantially a single iteration without affecting the accuracy of the motion computations. In addition, an efficient generalization of the LK method is presented, in which a masking of outliers and a multi-frame alignment increase the robustness and accuracy of motion computations.

According to a first aspect of the invention there is provided a computer implemented method for simultaneously computing a transformation between a set of at least two pixels in a sequence of image frames having known mutual relative trans-formations to corresponding pixels in a new image frame, the method comprising:

computing and storing in memory at least two sums over all pixels and over all frames in said sequence in said set of a respective intensity gradient of a first spatially aligned pixel in each frame of said sequence multiplied by a respective intensity or function thereof of a second pixel in the new image frame where in one of said sums the first and second pixels have identical locations in the respective frames and where in each additional sum the second pixel is shifted by a non-zero shift relative to its location in other sums;

computing said transformation using intensity and gradient values of the image frames in said sequence and said sums;

storing in memory weighted averages of at least two of said sums; and using said weighted averages and the intensity and gradient values of the frames in said sequence to re-compute said transformation.

Unlike many multi-frame alignment methods which combine only partial information from different frames (such as the registration parameters or feature correspondences used by the Bundle-Adjustment methods [7,8,9]), the present invention uses in multi-frame alignment all the pixels in several frames. A similar problem was addressed in [10,11] but they have substantial computational cost. With our proposed method, a multi-frame alignment is obtained with little additional computational cost compared to two-frame methods. As a result, it is more appropriate to online and real time applications.

It will also be appreciated that determining pixel transformation between image frames is frequently a first stage in subsequent image processing techniques, such as object and feature tracking, image stabilization, display of stabilized video, mosaicing, image construction, video editing, image enhancement, and so on.

BRIEF DESCRIPTION OF THE DRAWINGS

In order to understand the invention and to see how it may be carried out in practice, an embodiment will now be described, by way of non-limiting example only, with reference to the accompanying drawings, in which:

FIGS. 4a and 4b show two original image frames from a video sequence;

FIGS. 4c and 4d show stabilized composite images formed from the original frames shown in FIGS. 4a and 4b using respectively the traditional LK method and the method according to the invention;

FIGS. 5a to 5f show results of tracking moving objects in a sequence of movie frames;

DETAILED DESCRIPTION OF EMBODIMENTS

Figure 1:
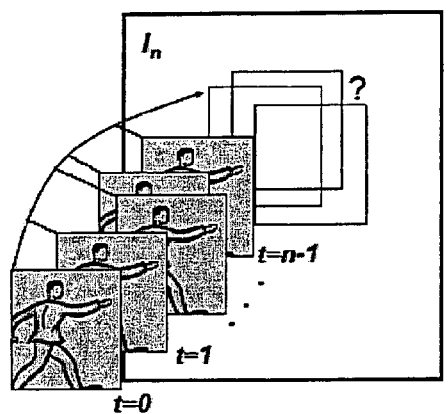
FIG. 1 is a pictorial representation showing an object tracked across multiple frames.

We begin by briefly describing the LK method for computing motion between two frames, and show how it can be done without iterative warping. This idea can be used either as a stand-alone acceleration of traditional methods, or as a component in a multi-frame alignment introduced in Section 3. The proposed algorithms were extensively tested on real data, and a few results are presented in section 4.

We first describe LK for sub-pixel translation only, and only later introduce the accelerated LK to larger and more general motions.

Brief Introduction to the LK Method

Let $I_1$ and $I_2$ be a pair of images, and let the motion between the two images be a pure translation (u,v). Under the constant-brightness assumption [2], the translation (u,v) can be computed by minimizing the error:

$$Err(u, v) = \sum_{x,y \in R} (I_2(x+u, y+v) - I_1(x, y))^2. \quad (1)$$

The summation is over the region of analysis R. This region includes most of the image for many image alignment applications [2,3], or only a window around a certain pixel for local motion computations [1,5].

LK approximates image intensities around each point using a first order Taylor expansion.

Let $\frac{\partial I_2}{\partial x}$ and $\frac{\partial I_2}{\partial y}$ be the horizontal and vertical derivatives of the image intensities, then:

$$I_2(x+u, y+v) \approx I_2(x, y) + \frac{\partial I_2}{\partial x}(x, y)u + \frac{\partial I_2}{\partial y}(x, y)v.$$

Under the LK assumptions, the translation (u,v) will minimize the following error:

$$Err(u, v) = \sum_{x,y \in R} \left( \frac{\partial I_2}{\partial x}(x, y)u + \frac{\partial I_2}{\partial y}(x, y)v + I_2(x, y) - I_1(x, y) \right)^2. \quad (2)$$

The basic step for the case of pure translation (u,v) is solving the following set of equations $$A \begin{bmatrix} u \\ v \end{bmatrix} = b,$$

where A is the LK matrix given by:

$$A = \begin{bmatrix} \sum_{x,y \in R} \frac{\partial I_2}{\partial x}(x, y)^2 & \sum_{x,y \in R} \frac{\partial I_2}{\partial x}(x, y) \frac{\partial I_2}{\partial y}(x, y) \\ \sum_{x,y \in R} \frac{\partial I_2}{\partial x}(x, y) \frac{\partial I_2}{\partial y}(x, y) & \sum_{x,y \in R} \frac{\partial I_2}{\partial x}(x, y)^2 \end{bmatrix}, \quad (3)$$

and b is given by:

$$b = \begin{bmatrix} b_x \\ b_y \end{bmatrix} = \begin{bmatrix} -\sum_{x,y \in R} \frac{\partial I_2}{\partial x}(x,y)(I_2(x,y) - I_1(x,y)) \\ -\sum_{x,y \in R} \frac{\partial I_2}{\partial y}(x,y)(I_2(x,y) - I_1(x,y)) \end{bmatrix}. \quad (4)$$

For simplicity of presentation, we sometimes omit the indices (x,y) from the summation in the following equations. In the iterative scheme, given an estimation of the image translation (u,v) from the current step, the image $I_1$ is warped towards the image $I_2$ (using back-warping) according to the current motion parameters, and the warped image is used in the next iteration, until convergence.

The LK matrix A (Eq. 3) does not change for each iteration, and is computed only once as described in detail by [4]. Whereas the free term b (Eq. 4) does vary in each iteration:

$$b^{(i+1)} = \begin{bmatrix} b_x^{(i+1)} \\ b_y^{(i+1)} \end{bmatrix} \quad (5)$$

$$= \begin{bmatrix} -\sum \frac{\partial I_2}{\partial x}(I_2 - I_1^{(i)}) \\ -\sum \frac{\partial I_2}{\partial y}(I_2 - I_1^{(i)}) \end{bmatrix}$$

$$= \begin{bmatrix} -\sum \frac{\partial I_2}{\partial x} I_2 + \sum \frac{\partial I_2}{\partial x} I_1^{(i)} \\ -\sum \frac{\partial I_2}{\partial y} I_2 + \sum \frac{\partial I_2}{\partial y} I_1^{(i)} \end{bmatrix},$$

where $I_1^{(i)}$ is obtained by warping $I_1$ towards $I_2$ according to the current estimation of the motion between $I_1$ and $I_2$.

In [2] it was further suggested to use a multi-resolution framework to handle large translations. We address large translations below.

Accelerating Sub-Pixel Translations

We propose to accelerate the computation of the term $b^{(i+1)}$ in Eq. 5 by avoiding the iterative image warping. When the relative translation between the frames is smaller than a pixel, image warping can be performed using a convolution: $I_1^{(i)} = I_1 * m^{(i)}$, where $m^{(i)}$ is a convolver whose size depends on the interpolation scheme. Bilinear and Bicubic interpolations require kernels of sizes 2×2 and 3×3 correspondingly. For example, a shift of 0.5 pixel to the right and 0.5 pixel downwards can be implemented using a convolution with the kernel $$m = \begin{bmatrix} 1/4 & 1/4 \\ 1/4 & 1/4 \end{bmatrix}.$$

Following this description we can examine $$\sum \frac{\partial I_2}{\partial x} I_1^{(i)}$$

in Eq. 5, the only element that needs to be re-evaluated at every iteration as $I_1$ is warped towards $I_2$.

$$\sum_{x,y} \frac{\partial I_2}{\partial x}(x,y) I_1^{(i)}(x,y) = \sum_{x,y} \frac{\partial I_2}{\partial x}(x,y)(I_1(x,y) * m^{(i)}) \quad (6)$$

$$= \sum_{0 \le k,l \le 1} m^{(i)}(k,l) \sum_{x,y} \frac{\partial I_2}{\partial x}(x,y) I_1(x-l, y-k)$$

And therefore, we can rewrite the first component of $b^{(i+1)}$ (from Eq. 5) as:

$$b_x^{(i+1)} = r_x + \sum_{0 \le k,l \le 1} m^{(i)}(k,l) s_x(k,l) \quad (7)$$

where $$r_x = -\sum_{x,y} \frac{\partial I_2}{\partial x}(x,y) I_2(x,y), \quad (8)$$

$$s_x(k,l) = \sum_{x,y} \frac{\partial I_2}{\partial x}(x,y) I_1(x-k, y-l).$$

are scalers that remain constant through out the iterations. The second component of $b^{(i+1)}$ can be manipulated in a similar way. Eq. 5 now becomes:

$$b^{(i+1)} = \begin{bmatrix} r_x + \sum_{k,l} m^{(i)} s_x \\ r_y + \sum_{k,l} m^{(i)} s_y \end{bmatrix} \quad (9)$$

Therefore, for a sub-pixel translation only the values of $m^{(i)}$ are changed in each iteration, while the rest of the terms are computed only once. As a result, very few operations are needed per iteration, independent of the size of the region of analysis.

To conclude, the number of operations needed for the pre-processing equals to the number of operations for a single LK iteration. For some platforms, postponing the interpolation to a later stage allows performing the image warping with a better precision. The number of operations done in each iteration is negligible, and consists of solving the LK equations (Eqs. 3, 9).

Accelerating Large Translations

A multi-resolution framework is usually used to handle large translations. Gaussian pyramids can be constructed for both images, and the motion parameters which were estimated in lower-resolution levels are used as initial estimations for finer levels [2].

When using the multi-resolution scheme, the residual translation is almost always sub-pixel, as the whole-pixel translation is recovered from the lower resolution (and enhanced at finer levels). Nevertheless, we should handle translation larger than a pixel. Doing so requires special care, as different iterations which differ in their whole-pixel translations use different pixels for the interpolation.

We prepare two tables—$s_x(k,l)$ and $s_y(k,l)$ (as in Eq. 8) for each level. The number of entries in the tables is determined by the number of possible (whole-pixel) translations. The tables $s_x$ and $s_y$ are initially empty. When a value is needed from one of the tables, the relevant term is computed only if it was not computed before. In this way correctness is guaranteed while avoiding unnecessary computations. The size of the tables does not influence the computational complexity, as they are being accessed only on demand. Note, for example, that if the whole-pixel translation for two iterations differ only in a single pixel, we can still save computations as only some of the tables entries are new (for bilinear interpolation: half are new, for bi-cubic interpolation only 3 terms out of 9 are new).

Since we construct tables for each level, the minimal number of "actual" iterations done in the proposed method equals to the number of levels in the pyramid (of course, most of the computations are done in the finest resolution level). Practically, we found that except for the coarsest resolution level, the residual translation was always sub-pixel.

General Parametric Motions

Pure translations are mostly used for local motion computations and feature tracking. However, image translation is usually insufficient to describe the motion of an entire frame, and more general motion models are needed.

One approach to recover a more general image motion is to approximate pure translations in small image regions ("optical flow"), and use them to solve for a more general parametric motion for the entire region of analysis [12,13,14].

An alternative approach is to directly compute a single parametric motion for the entire region of analysis "direct methods") [2,3]. We generalize the LK acceleration to more general motions assuming that non-overlapping windows have constant translations. Yet, the invention does not require that a translation be computed for each window, but directly computes a parametric motion for the entire image. For example, assuming use of an Affine motion model, the invention allows use of an approximated Affine motion model in which the translation (u(x,y),v(x,y)) at each pixel is given by:

$$\begin{bmatrix} u(x, y) \\ v(x, y) \end{bmatrix} = \begin{bmatrix} ax_w + by_w + c \\ dx_w + ey_w + f \end{bmatrix}. \quad (10)$$

where $(x_w, y_w)$ are the centers of the corresponding windows.

To compute the global parametric motion efficiently, we first compute the LK coefficients for each window w: (We omit the indices (x, y) from the summations.)

$$A_w = \begin{bmatrix} \sum_{x,y \in w} \frac{\partial I_2^2}{\partial x} & \sum_{x,y \in w} \frac{\partial I_2}{\partial x} \frac{\partial I_2}{\partial y} \\ \sum_{x,y \in w} \frac{\partial I_2}{\partial x} \frac{\partial I_2}{\partial y} & \sum_{x,y \in w} \frac{\partial I_2^2}{\partial y} \end{bmatrix}, \quad (11)$$

$$b_w = \begin{bmatrix} -\sum_{x,y \in w} \frac{\partial I_2}{\partial x}(I_2 - I_1) \\ -\sum_{x,y \in w} \frac{\partial I_2}{\partial y}(I_2 - I_1) \end{bmatrix}.$$

We then use the values of the LK coefficients to compute the 6×6 and 6×1 matrices used to solve for Affine motion. (See [15] for a detailed derivation of the set of equations for different motion models). For example, the original A(2,6) element of the 6×6 LK matrix is $$\sum_{x,y} \frac{\partial I_2}{\partial x} \frac{\partial I_2}{\partial y} xy.$$

Using the approximate Affine model (Eq. 10), we get the following element:

$$\sum_{x,y} \frac{\partial I_2}{\partial x} \frac{\partial I_2}{\partial y} x_w y_w = \sum_w \sum_{x,y \in w} \frac{\partial I_2}{\partial x} \frac{\partial I_2}{\partial y} x_w y_w \quad (12)$$

$$= \sum_w x_w y_w \sum_{x,y \in w} \frac{\partial I_2}{\partial x} \frac{\partial I_2}{\partial y}$$

As in the example shown in Eq. 12, given the LK coefficients of each window we can compute the LK equation set very efficiently, and solve for all six Affine parameters (a, ... , f).

Since the LK matrices of all the windows should be stored, a significant speedup can be achieved as long as the window size is large compared to the size of the interpolation kernel. In our tests we obtained almost identical acceleration to the translational motion model using windows of sizes 7×7 without noticeable loss in accuracy (relative to the real Affine motion model).

Runtime Evaluation

The speedup achieved with the proposed method is higher for those difficult scenes where the traditional LK converges slower than usual. When using a bilinear interpolation for the image warping, the speedup ratio in the total run time ranges from 2 to 4. This speedup is a result of a reduction by a factor of 3-10 in the number of image warps. The total running time includes the computation of Gaussian pyramids and the computation of image derivatives. For many applications, these computations are done anyway, making the number of LK iterations be the main computational cost, and maximal speedup is possible. The speedup is also increased when a more accurate interpolation is being used for the image warping, such as a bicubic interpolation. Another case where the speedup is larger is when a regularization term is used which favors small motions. Such a regularization usually increases the number of iterations needed for convergence. Some typical numerical results are given in Table 1. The analysis was performed on a PC, where memory access is very fast. In other platforms (like DSP cards) the bottleneck of the computations is usually the number of passes over the image, which further increases the benefit of using the method according to the invention.

TABLE 1

Performance (in frames per second) of the motion computations for some typical scenarios

| Motion & Scene Properties | Original LK (fsp) | Fast LK (fsp) |
|---|---|---|
| Translation (320×240) | 12.9 | 30.7 |
| Rotation & Translation (320×240) | 11.1 | 30.3 |
| Translation (600×800) | 1.7 | 5.0 |
| Affine (320×240), Sequence1* | 9.4 | 40.8 |
| Affine (320×240), Sequence2* | 17.7 | 43.4 |

Online Multi-Frame Alignment

The robustness and stability of the LK method can be increased by masking outliers and by using multi-frame alignment in which each frame is aligned simultaneously to several preceding frames and not only to the previous one.

FIG. 1 is a pictorial representation showing an object tracked across multiple frames. After some pre-processing, the region corresponding to the object in the new image frame is simultaneously aligned to the corresponding regions in several preceding image frames in the sequence.

Masking of Outliers

When aligning a sequence of images, we can use the alignment of frame $I_n$ to frame $I_{n-1}$ to determine whether we should ignore some pixels in $I_n$ before aligning $I_{n-1}$. Such pixels can include, for example, moving objects in the scene. A possible mask can be based on the intensity difference after alignment, divided by the local gradient:

$$M_n(x, y) = \begin{cases} 1 & \text{if } \frac{\sum_{W_{x,y}} (I_n - I_{n-1})^2}{\sum_{W_{x,y}} \|\nabla I_n\|^2} < r \\ 0 & \text{otherwise,} \end{cases} \quad (13)$$

where $W_{x,y}$ is a window around (x, y), and r is a threshold (We typically used r=1). When aligning $I_{n+1}$ to $I_n$, pixels in $I_n$ with $M_n(x,y)=0$ are ignored.

Simultaneously Aligning the Image to Several Preceding Frames

Assume that the images $I_0 \ldots I_{n-1}$ have already been aligned and let $I_n$ be the new frame to be aligned. To compute the motion parameters of $I_n$, we now minimize the residual error after aligning this frame to its preceding frames:

$$Err(u, v) = \sum_{k<n} w_k^n \sum_{x,y} \left( u \frac{\partial I_n}{\partial x} + v \frac{\partial I_n}{\partial y} + I_n - I_k \right)^2, \quad (14)$$

This error term is a generalization of the one used in traditional LK (Eq. 2). The weights $W_k^n$ control the contribution of each frame to the registration process. Frames which are much earlier than the current one, typically get smaller weights In this variant, the preceding frames are aligned to the new frame $I_n$, and thus the derivatives are computed from $I_n$. Since the motion parameters u and v are multiplied with terms that are independent of k, the error function can be simplified (we assume that $$\sum_k (w_k^n) = 1):$$

$$\arg \min_{u,v} \{Err(u, v)\} = \quad (15)$$

-continued $$\arg \min_{u,v} \left\{ \sum_{x,y} \left( u \frac{\partial I_n}{\partial x} + v \frac{\partial I_n}{\partial y} + I_n - \sum_{k<n} w_k^n I_k \right)^2 \right\}.$$

This is equivalent to aligning the new frame to a weighted average of the preceding frames. A similar scheme has been suggested before without a formal justification in [3]. Computing the average image can be done online by using exponentially decreasing weights, updating the weighted average after each alignment:

$$\hat{I}_n = q \frac{q^{n+1} - 1}{q^{n+2} - 1} \hat{I}_{n-1} + \left(1 - q \frac{q^{n+1} - 1}{q^{n+2} - 1}\right) I_n. \quad (16)$$

Which is equivalent to using weights for which $$w_{k-1}{}^n = q \cdot w_k{}^n \quad (17)$$

In order to compute the average of preceding images, they should be warped to a single reference frame. However, doing so may cause a problem: Warping all the frames to a predetermined reference frame (say—the first frame) will prevent handling large accumulative motions, while warping all the frames to the last aligned frame will result in substantial interpolation errors due to the repetitive warpings. We solve this problem by warping each image to a single reference frame only according to the sub-pixel component of the motion (which is small and typically has zero mean). After compensating for the sub-pixel motion, the images are warped towards the last frame. This scheme avoids multiple interpolation errors, as whole-pixel warping does not require any interpolation.

A validity mask can be incorporated into this scheme, but only as a relative weight between the different frames. That is:

$$\hat{I}_n(x, y) = \frac{\sum_{k<n} w_k^n M_k(x, y) I_k(x, y)}{\sum_{k<n} w_k^n M_k(x, y)}, \quad (18)$$

This masking is sufficient to overcome moving objects that change their location from frame to frame, but doesn't allow us to completely ignore a region in the scene. The reason is that in order to use a more general mask, the derivatives should be re-weighted after each iteration of the LK, which cannot be done with the algorithmic acceleration described above. This is also the reason why this variant is less accurate for object tracking: Given a window to be tracked, one cannot determine its corresponding window in the new frame before actually recovering the motion of this window. These limitations are solved by the second variant described next, which is somewhat less efficient, but works better in several scenarios.

Warping the Future: Aligning to Preceding Frames

A more accurate manner of implementation for the multi-frame scheme is to use the derivatives in the preceding frames, and to align the new frame simultaneously towards all these frames.

Assume again that the images $I_0 \ldots I_{n-1}$ have already been aligned and let $I_n$ be the new frame to be aligned. To compute the motion parameters of the new frame, we minimize the residual error after aligning this frame to its preceding frames:

$$Err(u, v) = \sum_{k<n} w_k^n \cdot \sum_{x,y} M_k \cdot \left(u \frac{\partial I_k}{\partial x} + v \frac{\partial I_k}{\partial y} + I_k - I_n\right)^2. \quad (19)$$

We already added the validity mask $M_k(x, y)$, which no longer has to sum to one for each pixel. Note also the use of the derivatives $\partial I_k/\partial x$ and $\partial I_k/\partial y$ which are now estimated from the intensities of the preceding images $\{I_k\}$.

For clarity of presentation, we focus on the pure translational case with sub-pixel motion. The generalization to other motions is similar to the alignment of two frames. For the case of pure translation, computing the derivatives of the error function with respect to u and v and setting them to zero yields the linear set of equations $$A \begin{bmatrix} u \\ v \end{bmatrix} = b$$

where:

$$A = \sum_{x,y} \begin{bmatrix} \sum_{k<n} M_k \frac{\partial I_k^2}{\partial x} & \sum_{k<n} M_k \frac{\partial I_k}{\partial x} \frac{\partial I_k}{\partial y} \\ \sum_{k<n} M_k \frac{\partial I_k}{\partial x} \frac{\partial I_k}{\partial y} & \sum_{k<n} M_k \frac{\partial I_k^2}{\partial y} \end{bmatrix} \quad (20)$$

and $$b = -\sum_{x,y} \begin{bmatrix} \sum_{k<n} M_k \frac{\partial I_k}{\partial x} I_k - \left(\sum_{k<n} M_k \frac{\partial I_k}{\partial x}\right) I_n \\ \sum_{k<n} M_k \frac{\partial I_k}{\partial y} I_k - \left(\sum_{k<n} M_k \frac{\partial I_k}{\partial y}\right) I_n \end{bmatrix} \quad (21)$$

In this implementation a temporal image averaging can not be used to represent all the preceding images. However, each term of the linear system in Eqs. 20-21 can be computed accumulatively. This requires storing 7 accumulated matrices—3 for the computation of A and 4 for b. (If all the frames are aligned to a single reference frame, the 3 terms of A can be spared by storing only the sum values). These matrices are updated in each alignment, and no further information should be saved from the past sequence.

To conclude, by combining the accumulative computation with the LK acceleration described above the multi-frame alignment can be done online at a computational complexity of O(N) instead of the naive cost which is O(N*T*L), where N is the number of pixels in each image, T is the number of frames used for the alignment, and L is the number of LK iterations.

Multi-Frame Experiments

The proposed multiframe algorithm has been tested in various scenarios, including videos of dynamic scenes and videos in which the image motion does not fit the motion model. Concerning computational time, the performance of the multi-frame alignment was slightly slower than the traditional single-frame alignment. To show stabilization results in print, we have averaged the frames of the stabilized video. When the video is stabilized accurately, static regions appear sharp while dynamic objects are ghosted. When stabilization is erroneous, both static and dynamic regions are blurred.

FIGS. 3 and 4 compare sequence stabilization using multiframe alignment with original LK (with pyramids). A large portion of the scene consists of dynamic objects (the moving pedestrians). In spite of the dynamics, after multiframe alignment the sequences was correctly stabilized.

Figures 3A, 3B, 3C:
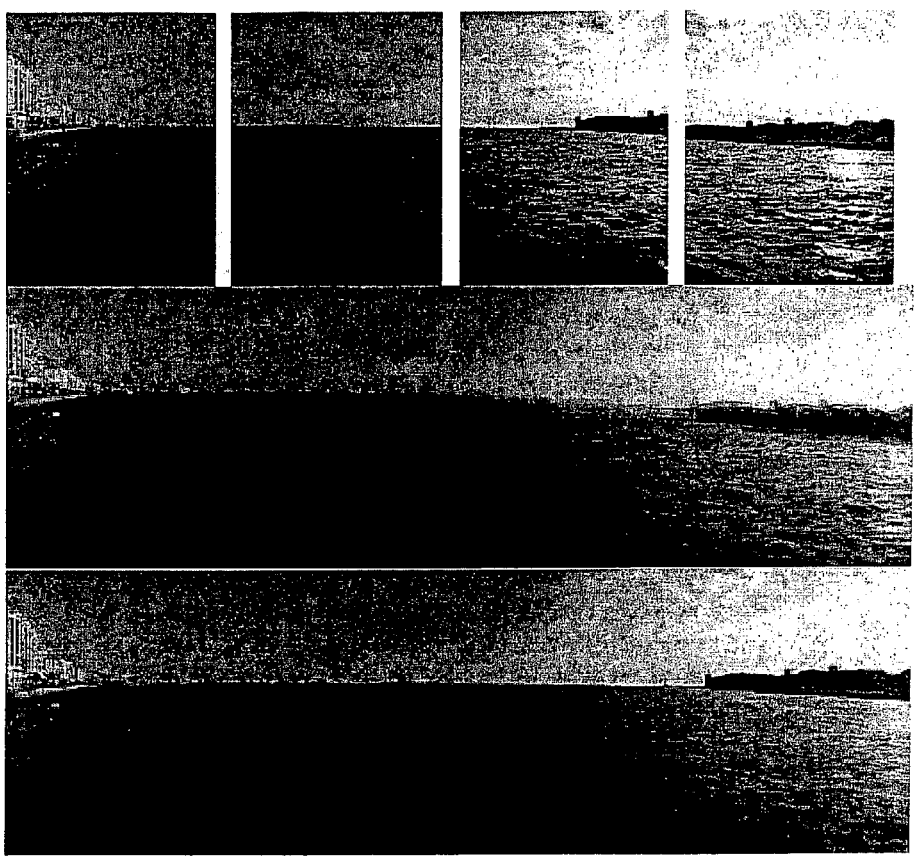
FIG. 3a shows a few original frames from a sequence of 300 frames.
FIGS. 3b and 3c show averaging the frames shown in FIG. 3 according to the traditional LK method and the method according to the invention, respectively.

Specifically, FIG. 3a shows several original frames from a sequence of 300 frames of the promenade of Thessaloniki. The waves in the input sequence and the lack of features make the registration of this sequence very challenging. With traditional alignment as shown in FIG. 3b the sea and the right side of the image are blurred. By using multi-frame alignment according to the invention as shown in FIG. 3c, the stabilization was substantially improved. The sequence scans the scene from left to right, so the left side in naturally aligned, and alignment errors accumulate towards the right.

FIGS. 4a and 4b show two original frames from a sequence of 200 frames of walking pedestrians at the Edinburgh festival. The scene dynamics is visible by ghosting, but while using traditional LK method as shown in FIG. 4c the background is also blurry due to erroneous stabilization, the background appears much sharper using multi-frame alignment according to the invention as shown in FIG. 4d.

Figure 2A:
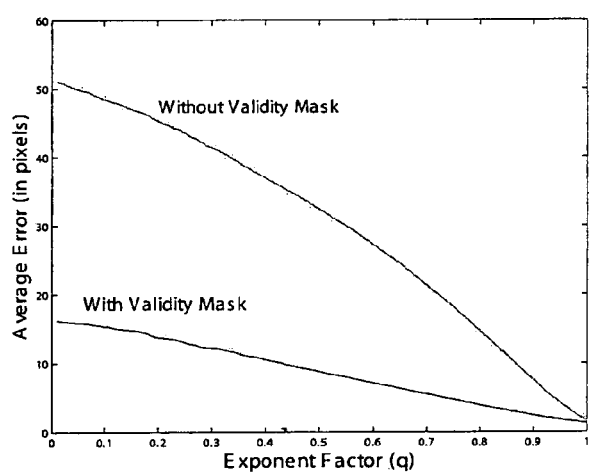
FIG. 2a is a graph comparing sequence stabilization using multiframe alignment with original LK between pairs of frames (with pyramids)
Figure 2B:
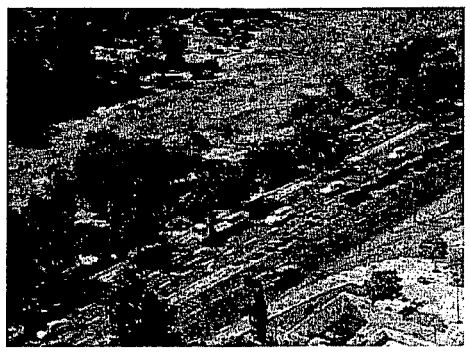
FIGS. 2b and 2c show motion drift in two frames when stabilizing long sequences.
Figure 2C:

We also tested the algorithm on long sequences to evaluate the effectiveness of the multiframe alignment in reducing the drift of the motion computations. For very long sequences, it is crucial to reduce the drift without storing a huge amount of frames in the memory. An example is shown in FIG. 2. The road sequence (FIG. 2a) was stabilized using exponentially decreasing weights with different exponents. The drift-error was defined as the average error in the computed displacement between the first and last frames, for four selected points in the image. (The ground truth displacements were computed manually). The advantage of using a long history to reduce the motion drift is clear from the monotonically decreasing error in FIG. 2. For example, using an exponent of q=0.99 gave an average error of about a pixel. (And the error continued to decrease with exponents closer to one.) The benefit of using a validity mask is also evident from the graph. The contribution of the validity mask is larger when using fewer frames for the alignment.

FIG. 5 shows a couple of tracking results. The tracked objects were selected from the Edinburgh sequence (FIG. 3). The appearance of the tracked objects change during the tracking as they step towards or away from the camera. (We have not updated the scale of the objects during the tracking). To overcome the changes of appearance we used a relatively small exponent factor (q=0.5). Nevertheless, the proposed method performed well even when the traditional LK failed. The difference in the performance of the two methods was most evident in the presence of a textured background. Using traditional LK, the tracker tended to lose the object and follow the background instead, while the multiframe tracker ignored the background and remained fixed on the object.

Specifically, FIGS. 5a and 5d show the initial locations of a tracker, as drawn by the user so as to track motion of a desired object. FIGS. 5b and 5e shows the location of the tracker after 100 frames using traditional LK. In both cases the tracking failed. FIGS. 5c and 5f show the location of the tracker after 100 frames after successfully tracking the object using multi-frame alignment according to the invention.

Figure 6:
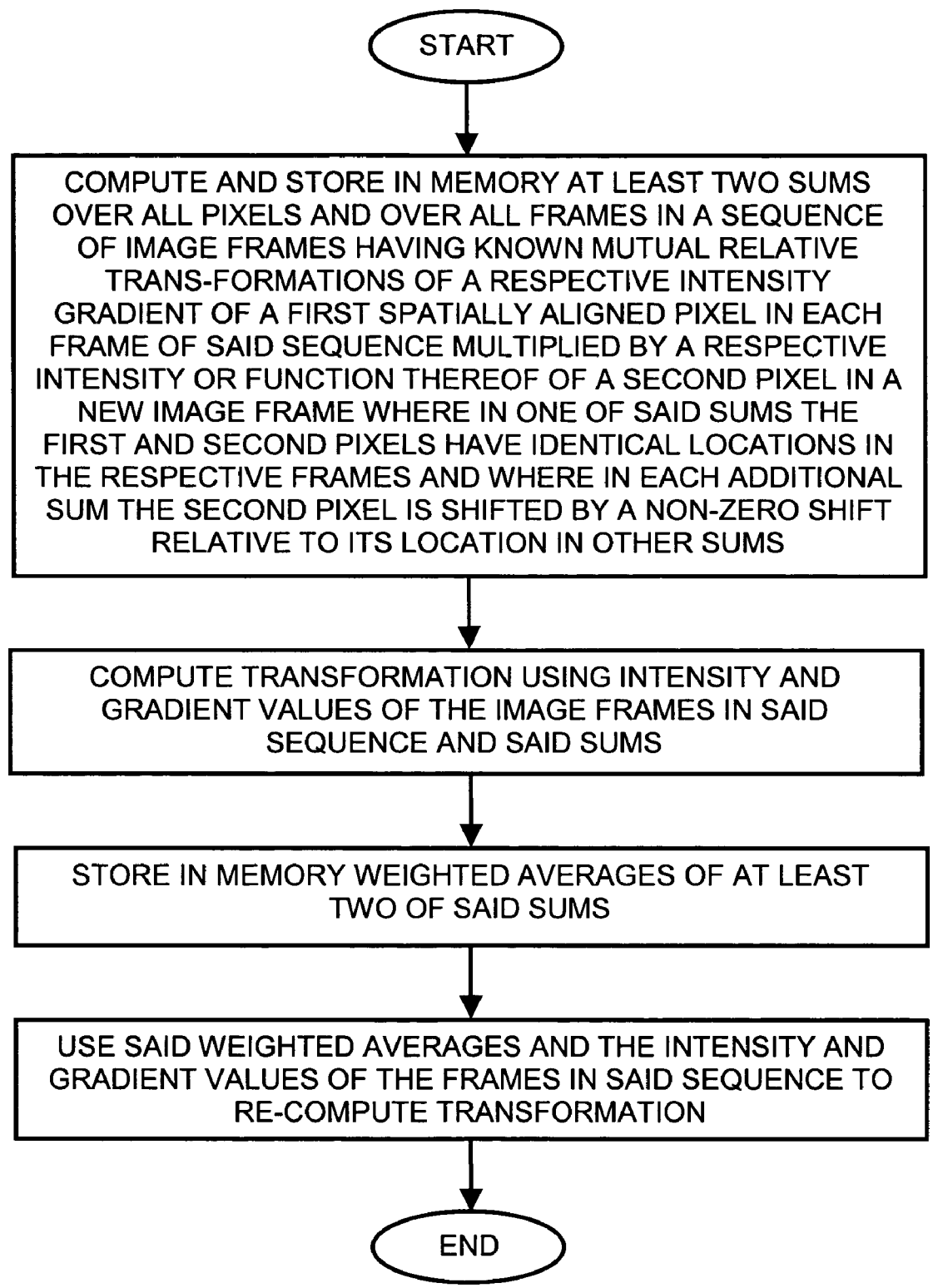
FIG. 6 is a flow diagram showing the principal operations carried out by a method according to an embodiment of the invention for simultaneously computing a transformation between a set of at least two pixels in a sequence of image frames having known mutual relative transformations to corresponding pixels in a new image frame.

FIG. 6 is a flow diagram showing the principal operations carried out in accordance with an embodiment of the invention for simultaneously computing a transformation between a set of at least two pixels in a sequence of image frames having known mutual relative transformations to corresponding pixels in a new image frame. Thus, in a pre-processing stage there are computed and stored in memory at least two sums over all pixels and over all frames in the sequence in the set of a respective intensity gradient of a first spatially aligned pixel in each frame of the sequence multiplied by a respective intensity or function thereof of a second pixel in the new image frame. In one of the sums the first and second pixels have identical locations in the respective frames and in each additional sum the second pixel is shifted by a non-zero shift relative to its location in other sums, there being no importance to the order in which the sums are computed. The transformation is then computed using intensity and gradient values of the image frames in the sequence and the said sums. Weighted averages of at least two of the sums are stored in memory, and are used together with the intensity and gradient values of the frames in the sequence to re-compute the transformation.

In a specific application of the invention there are computed and stored at least four sums over pixels and over all frames in the sequence in the set of a respective intensity gradient of a first spatially aligned pixel in each frame of said sequence multiplied by a respective intensity or function thereof of a second pixel in the new image frame. In two of the sums the first and second pixels have identical locations in the respective frames and in each additional sum the second pixel is shifted by a non-zero shift relative to its location in other sums. Again, there is no importance to the order in which the sums are computed. The transformation is computed using intensity and gradient values of the image frames in the sequence and the stored sums. Weighted averages of at least two of the sums are stored in memory; and are used together with the intensity and gradient values of the frames in the sequence to re-compute the transformation.

Other specific applications of the invention allow computation of a transformation between a set of at least two pixels in a first image frame, to corresponding pixels in a second image frame. Such applications are in fact particular cases of the general algorithm described above and shown in FIG. 6 and the specific case mentioned above, where the sequence of image frames contains only a single image frame. In this case, of course, there is no significance to the frames in the sequence being spatially aligned since there is only one frame.

It thus emerges that the pre-processing stage is performed once for all pixels of interest in the image frame, after which transformations may be quickly computed. As noted above, the pre-processing stage requires similar computation effort as a single iteration of the LK method thus reducing the overall computation effort required by the invention as compared with the LK method and achieving good results with reduced computer resources.

In one embodiment of the invention, the intensity gradient of a first spatially aligned pixel in each frame of the sequence is multiplied by a respective difference in intensity between respective pixels in each image frame and the second image frame. In one embodiment of the invention, the sums are weighted. In one embodiment of the invention, the sums are weighted according to a mask indicating whether pixels are to be included or excluded. In one embodiment of the invention, the transformation is used to track image features or objects in the image frames.

In one embodiment of the invention, the at least one computed frame is generated from at least two image frames taking into account relative movement between the at least two image frames. This may be done by combining portions of said at least two image frames, or by assigning respective color values to pixels in the computed frame as a function of corresponding values of aligned pixels in the at least two frames. In one embodiment of the invention, at least two of the image frames or parts thereof are displayed after neutralizing relative movement between the image frames Once the transformation is known, it is then possible to compute relative movement between image frames and so to neutralize relative movement between at least two frames so as to produce a stabilized image, which when displayed is free of camera movement. This is particularly useful to eradicate the effect of camera shake. However, neutralizing relative movement between at least two frames may also be a precursor to subsequent image processing requiring a stabilized video sequence. Thus, for example, it is possible to compute one or more computed frames from at least two frames taking into account relative camera movement between the at least two frames. This may be done by combining portions of two or more frames for which relative movement is neutralized, so as to produce a mosaic containing parts of two or more video frames, for which movement has been neutralized. It may also be done by assigning respective color values to pixels in the computed frame as a function of corresponding values of aligned pixels in two or more frames, for which movement has been neutralized. Likewise, the relative camera movement may be applied to frames in a different sequence of frames of images or to portions thereof. Frames or portions thereof in the sequence of frames may also be combined with a different sequence of frames.

Figure 7:
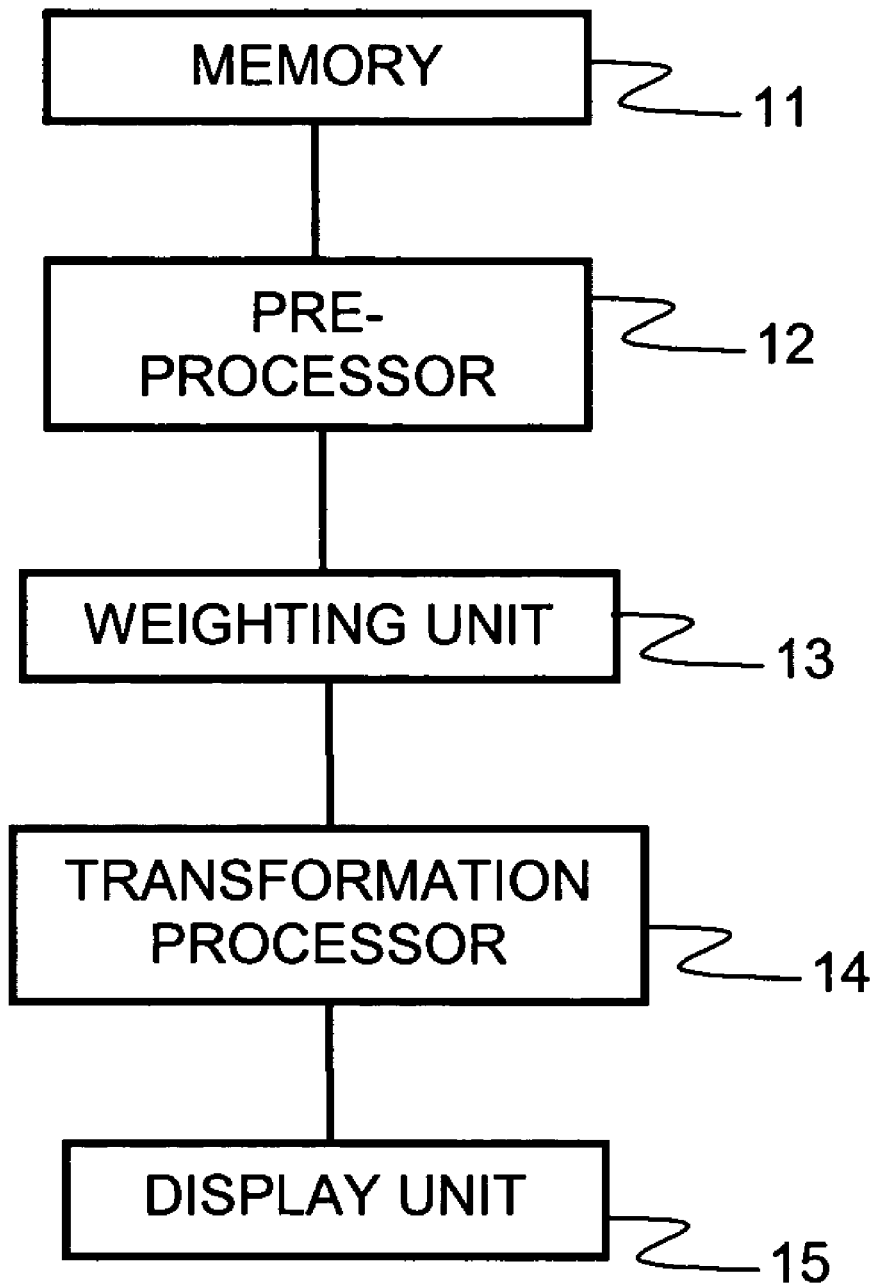
FIG. 7 is a block diagram showing functionality of a system according to an embodiment of the invention for simultaneously computing a transformation between a set of at least two pixels in a sequence of image frames having known mutual relative transformations to corresponding pixels in a new image frame.

FIG. 7 is a block diagram showing functionality of a system 10 according to an embodiment of the invention for simultaneously computing a transformation between a set of at least two pixels in a sequence of image frames having known mutual relative transformations to corresponding pixels in a new image frame. The system 10 includes a memory 11, and a pre-processor 12 coupled to the memory for computing and storing in the memory at least two sums over all pixels and over all frames in said sequence in said set of a respective intensity gradient of a first spatially aligned pixel in each frame of said sequence multiplied by a respective intensity or function thereof of a second pixel in the new image frame where in one of said sums the first and second pixels have identical locations in the respective frames and where in each additional sum the second pixel is shifted by a non-zero shift relative to its location in other sums.

A weighting unit 13 is coupled to the memory 11 for computing weighted averages of at least two of said sums; and a transformation processor 14 is coupled to the memory 12 and to the weighting unit 13 for computing the transformation using intensity and gradient values of the image frames in said sequence and said sums. The transformation processor 14 stores the weighted averages in memory and re-computes the transformation using the weighted averages and the intensity and gradient values of the frames in the sequence.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

CONCLUDING REMARKS

The invention thus provides an algorithmic acceleration of the Lucas-Kanade method which avoids the iterative image warping used in the original method. This acceleration was also combined with a multiframe alignment to obtain a fast and robust alignment. Experimental results show improvement in complexity when aligning two frames, and in both complexity and accuracy when aligning a sequence.

The invention overcomes at least some drawbacks of current multiframe alignment methods characterized by high complexity or restrictive assumptions (such as small motion or large memory).

The invention will find use for other various applications, such as computing stereo, optical flow, or recovering the camera ego-motion. In all these applications, the LK method is widely used (in small windows), and therefore can be improved using the invention.

The invention claimed is:

1. A computer implemented method for simultaneously computing a transformation between a set of at least two pixels in a sequence of image frames having known mutual relative transformations to corresponding pixels in a new image frame, the method comprising:
    computing and storing in memory at least two sums over all pixels and over all frames in said sequence in said set of a respective intensity gradient of a first spatially aligned pixel in each frame of said sequence multiplied by a respective intensity or function thereof of a second pixel in the new image frame where in one of said sums the first and second pixels have identical locations in the respective frames and where in each additional sum the second pixel is shifted by a non-zero shift relative to its location in other sums;
    computing said transformation using intensity and gradient values of the image frames in said sequence and said sums;
    storing in memory weighted averages of at least two of said sums; and
    using said weighted averages and the intensity and gradient values of the frames in said sequence to re-compute said transformation.

2. The method according to claim 1, wherein said function is a difference in intensity between respective pixels in each image frame of said sequence and the new image frame.

3. The method according to claim 1, wherein said sequence contains a single image frame only.

4. The method according to claim 1, wherein said sums are weighted.

5. The method according to claim 4, wherein said sums are weighted according to a mask indicating whether pixels are to be included or excluded, and to the location of each frame in the sequence.

6. The method according to claim 1, further including using said transformation to track image features or objects in said image frames.

7. The method according to claim 1, further including using said transformation to compute 3D values of pixels in the scene (known as "stereo computation").

8. The method according to claim 1, further generating at least one computed frame from at least two image frames taking into account relative movement between said at least two image frames.

9. The method according to claim 8, wherein generating at least one computed frame includes combining portions of said at least image two frames.

10. The method according to claim 8, wherein generating at least one computed frame includes assigning respective color values to pixels in the computed frame as a function of corresponding values of aligned pixels in said at least two frames.

11. The method according to claim 1, further including displaying at least two of said image frames or parts thereof after neutralizing relative movement between said image frames.

12. A computer implemented method for simultaneously computing a transformation between a set of at least two pixels in a sequence of image frames having known mutual relative transformations to corresponding pixels in a new image frame, the method comprising:
    computing and storing in memory at least four sums over pixels and over all frames in said sequence in said set of a respective intensity gradient of a first spatially aligned pixel in each frame of said sequence multiplied by a respective intensity or function thereof of a second pixel in the new image frame where in two of said sums the first and second pixels have identical locations in the respective frames and where in each additional sum the second pixel is shifted by a non-zero shift relative to its location in other sums;
    computing said transformation using intensity and gradient values of the image frames in said sequence and said sums;
    storing in memory weighted averages of at least two of said sums; and
    using said weighted averages and the intensity and gradient values of the frames in said sequence to re-compute said transformation.

13. The method according to claim 12, wherein said function is a difference in intensity between respective pixels in each image frame of said sequence and the new image frame.

14. The method according to claim 12, wherein said sequence contains a single image frame only.

15. The method according to claim 12, wherein said sums are weighted.

16. The method according to claim 15, wherein said sums are weighted according to a mask indicating whether pixels are to be included or excluded.

17. The method according to claim 12, further including using said transformation to track image features or objects in said image frames.

18. The method according to claim 12, further including generating at least one computed frame from at least two image frames taking into account relative movement between said at least two image frames.

19. The method according to claim 18, wherein generating at least one computed frame includes combining portions of said at least image two frames.

20. The method according to claim 18, wherein generating at least one computed frame includes assigning respective color values to pixels in the computed frame as a function of corresponding values of aligned pixels in said at least two frames.

21. The method according to claim 12, further including displaying at least two of said image frames or parts thereof after neutralizing relative movement between said image frames.

22. A computer program embodied on a non-transitory computer readable medium comprising computer program code means for performing the method of claim 1 when said program is run on a computer.

23. A system for simultaneously computing a transformation between a set of at least two pixels in a sequence of image frames having known mutual relative transformations to corresponding pixels in a new image frame, the system comprising:
- a memory;
- a pre-processor coupled to the memory for computing and storing in the memory at least two sums over all pixels and over all frames in said sequence in said set of a respective intensity gradient of a first spatially aligned pixel in each frame of said sequence multiplied by a respective intensity or function thereof of a second pixel in the new image frame where in one of said sums the first and second pixels have identical locations in the respective frames and where in each additional sum the second pixel is shifted by a non-zero shift relative to its location in other sums;
- a weighting unit coupled to the memory for computing weighted averages of at least two of said sums; and
- a transformation processor coupled to the memory and to the weighting unit for computing said transformation using intensity and gradient values of the image frames in said sequence and said sums; for storing the weighted averages in memory; and for re-computing said transformation using said weighted averages and the intensity and gradient values of the frames in said sequence.

24. A system for simultaneously computing a transformation between a set of at least two pixels in a sequence of image frames having known mutual relative transformations to corresponding pixels in a new image frame, the system comprising:
- a memory;
- a pre-processor coupled to the memory for computing and storing in memory at least four sums over pixels and over all frames in said sequence in said set of a respective intensity gradient of a first spatially aligned pixel in each frame of said sequence multiplied by a respective intensity or function thereof of a second pixel in the new image frame where in two of said sums the first and second pixels have identical locations in the respective frames and where in each additional sum the second pixel is shifted by a non-zero shift relative to its location in other sums;
- a weighting unit coupled to the memory for computing weighted averages of at least two of said sums; and
- a transformation processor coupled to the memory and to the weighting unit for computing said transformation using intensity and gradient values of the image frames in said sequence and said sums; for storing the weighted averages in memory; and for re-computing said transformation using said weighted averages and the intensity and gradient values of the frames in said sequence.

* * * * *